Patented Dec. 1, 1931

1,834,236

UNITED STATES PATENT OFFICE

EMILE CAMPAGNE, OF VILLEURBANNE, FRANCE, ASSIGNOR OF ONE-HALF TO ALPHONSE GILDEMEISTER, OF PARIS, FRANCE

PROCESS FOR TREATING VANADIUM ORES AND PARTICULARLY VANADATES OF LEAD AND OTHER METALS

No Drawing. Application filed May 31, 1930, Serial No. 458,892, and in France June 24, 1929.

The process of treatment according to the invention consists essentially in subjecting vanadium ores and particularly ores constituted by lead vanadate alone or associated with other metals such as copper, zinc, bismuth, to a reduction in the presence of a flux having as result the bringing of the lead and other heavy metals to the metallic state, whilst the vanadic acid is brought only to a degree of oxidation below $V_2O_5$ and in particular to the sate of trioxide $V_2O_3$. This trioxide is almost infusible and quite insoluble in water, which properties considerably facilitate its subsequent separation.

The reduction may be effected by any of the reducing agents ordinarily used in industry and particularly by carbon in its different forms, carbonic oxide, or hydrogen either pure or mixed with other reducing or neutral gases. It is applied to the ore to which is added a flux, which allows the liberated metals to unite readily by as complete a separation as possible from the slag containing the vanadium.

The essential condition is that the flux used should be incapable of reacting under working conditions upon the reducing agent or upon the product of the reduction of the vanadic acid and particularly upon the vanadium trioxide $V_2O_3$. This oxide should remain free so that on treating the slag with a suitable solvent, which is usually water, the vanadium trioxide can be separated by solution followed by filtration.

Amongst the fluxes suitable for the purpose there may be mentioned by way of example the halogen compounds of the metals of the alkalis and alkaline earths and particularly the alkaline and alkaline earth chlorides and cyanides either alone or mixed; such as chloride of sodium, of potassium, of barium, which are the most interesting for industrial application. In the conditions of treatment, that is to say at the temperature of fusion of these fluxes, which varies between 700° C. and 1000° C., the vanadium trioxide formed by the reducing action defined above, is incapable of displacing the halogen acid from its combination with the alkaline or alkaline earth metals. On treating the slag with water there is obtained a solution of the salts or of the mixtures of salts used, leaving an undissolved residue, which consists of the vanadium trioxide mixed with any excess of the reducing agent used, and of the original impurities in the ore such as silica, iron oxide and in general all the non-volatile constituents of the ore other than the heavy metals separated out in the metallic state.

The reduction of the vanadates by carbon in the presence of sodium carbonate or sulphate has already been suggested several times, but the flux used does not fulfil the conditions specified above and the result obtained was entirely different. The flux reacting upon the vanadium trioxide set free at a given moment could not be separated by simple solution and filtration. It was necessary to have recourse to a whole series of chemical treatments more or less complicated according to the nature and the proportion of the impurities contained in the ore and to the degree of purity of the vanadic acid to be obtained finally. The technical result obtained by the process according to the invention is much superior, since it is possible to obtain more simply a much more complete separation of the vanadium.

The reduction of the vanadates may be carried out, according to the quantities treated, either in crucibles or in a reverbatory furnace or in any other suitably chosen continuous or discontinuous industrial apparatus.

By way of example the following method of carrying out the process is given:—

Ore containing from 18 to 19 per cent. of vanadic acid and 60 per cent. of lead and copper is ground, dried and mixed with 10 to 15 per cent. of powdered wood charcoal and 100 to 200 per cent. of alkaline chlorides. The mixture is heated in crucibles without appreciably exceeding the melting point of the chlorides. There is thus obtained a regulus containing almost the whole of the lead and copper and a slag, which when treated with water leaves a residue containing about 30 per cent of vanadium metal principally in the form of the trioxide together with the silica and the iron oxide originally contained in the ore. The aqueous solution of the chlorides separated from the insoluble residue does not contain any sensible traces of vanadium. It can be evaporated so as to recover the chlorides. The vanadium concentrate obtained by this very simple treatment can be treated by any known process to obtain pure vanadic acid. In particular it can be subjected with great advantage, as compared with the direct treatment of the ore, to a process of extraction by chlorine according to U. S. Patent No. 1,415,028 of the 9th May 1922. It can also be converted into vanadate either in the dry or wet way, and then the solution of vanadate purified so as to remove the silica and the iron oxide. This vanadate subjected to a new reduction then yields vanadium trioxide sufficiently pure for the greater number of technical uses.

It is to be clearly understood that the same principle of reduction may be applied to other ores, such as the ores of tungsten, molybdenum, and the like.

Claims:

1. A process for the treatment of vanadium ore which consists in subjecting said ore in the presence of a flux to a reducing action whereby the heavy metals are obtained in the metallic state and the vanadium in the form of insoluble trioxide.

2. A process for the treatment of vanadium ore as claimed in claim 1 wherein the flux is of such a nature as not to react in the conditions of working upon the reducing agent nor upon the product of the reduction of the ore of vanadium treated.

3. A process for the treatment of vanadium ore as claimed in claim 1, wherein the flux employed is a salt of the group consisting of chlorides and cyanides, alkali and alkaline-earth metals.

In testimony whereof he has signed this specification.

EMILE CAMPAGNE.